United States Patent [19]
Sugiyama et al.

[11] Patent Number: 5,784,192
[45] Date of Patent: Jul. 21, 1998

[54] OPTICAL AMPLIFYING REPEATER

[75] Inventors: Akira Sugiyama, Sapporo; Shinichirou Harasawa, Kawasaki, both of Japan

[73] Assignee: Fujitsu Limited, Kanagawa, Japan

[21] Appl. No.: 582,706

[22] Filed: Jan. 4, 1996

[30] Foreign Application Priority Data

Mar. 20, 1995 [JP] Japan .................. 7-061010

[51] Int. Cl.$^6$ .................. H04B 10/08; H01S 3/00
[52] U.S. Cl. .................. 359/341; 359/143; 359/177
[58] Field of Search .................. 359/134, 143, 359/160, 177, 341

[56] References Cited

U.S. PATENT DOCUMENTS 5,436,750  7/1995  Kawano .................. 359/177
5,455,704  10/1995  Mizouchi et al. .................. 359/179
5,500,756  3/1996  Tsushima et al. .................. 359/177

OTHER PUBLICATIONS

Chen et al, IEEE Photonics Technology Letters, vol. 9, #4, pp. 526–528, Apr. 1997.

*Primary Examiner*—Nelson Moskowitz
*Attorney, Agent, or Firm*—Helfgott & Karas, P.C.

[57] ABSTRACT

An optical amplifying repeater is provided which enables even after the main input optical signal is disconnected, the continued returning of a response signal in response to a command signal from an end station. This optical amplifying repeater comprises an optical amplifier, an automatic level control loop including therein a drive control unit, a supervisory unit which returns a response signal RS responding to a command signal CM from an end office, and a detection/control unit which controls the drive control unit so as to increase the amplitude of the response signal RS when a loss of the main optical signal S from an optical transmission line is detected.

4 Claims, 14 Drawing Sheets

OPTICAL AMPLIFYING REPEATER

BACKGROUND OF THE INVENTION

1. Field of the Invention

The present invention relates to an optical amplifying repeater which forms the central part of, for example, a submarine optical amplifying and repeating apparatus.

At present, in long-distance transmission of optical communications systems, the so-called optical amplifying and repeating systems are coming into wide use, in which systems optical amplifiers are contained in the above repeaters.

In such optical communications systems, because the distance from one end office to another is extremely long, it is not easy to monitor or control each of the optical amplifying repeaters which are cascade connected between the two end offices.

For this reason, in general, to perform monitoring or control of each of the optical amplifying repeaters, a remote repeater monitor and control system, which uses light modulation, is employed. The present invention includes an improvement to an optical amplifying repeater which is managed by a remote repeater monitor and control system.

2. Description of the Related Art

As will be described in detail with regard to the accompanying drawings, in a multi-stage optical amplifying and repeating transmission system, a long-distance optical transmission line is laid between two end offices A and B, a plurality of optical amplifying repeaters being connected in cascade along this optical transmission line.

Assume that a cable failure occurs when data is being transmitted from end office B to end office A. When this occurs, because the normal reception of data at the end office A is suspended, end office A immediately starts a search for the causative fault. This fault search is performed by the use of a command signal CM by which a main (carrier) optical signal S is modulated and the response signal RS which is output from each amplifying repeater in response thereto.

In the above-noted system, when the above-noted cable failure occurs, the optical carrier signal S is no longer input to the optical amplifying repeater. This is a loss of the optical input.

When this optical input loss occurs, because the optical carrier signal S is no longer input to the optical amplifying repeater, it becomes impossible to apply the modulation of the above-noted response signal RS to this optical carrier signal S. When this occurs, this optical amplifying repeater applies RS modulation instead to the ASE (amplified spontaneous emission). This ASE is a noise component of a relatively wide bandwidth which is inevitably generated by each optical amplifying repeater.

Although it is theoretically possible to apply modulation in accordance with the response signal RS to this ASE, in actuality the modulation of the amplified spontaneous emission by the response signal RS is insufficient. As will be described later, in the range in which the drive current $I_{LD}$ of the optical amplifying repeater is small, the variation of the amplified spontaneous emission with respect to the deviation in $I_{LD}$ is relatively large.

In response to the loss of optical input, when the ALC (automatic level control) loop operates sufficiently, so that drive current $I_{LD}$ Of the optical amplifier becomes large, in this range in which $I_{LD}$ is large, the variation in the output of the amplified spontaneous emission is relatively small. For this reason, when applying modulation to the ASE with the amplitude of the normal response signal RS, the resulting modulation output is extremely small. Ultimately, after the optical carrier signal S is lost, even if modulation is applied to the ASE by the response signal RS, it becomes difficult to perform such modulation. As a result, it becomes difficult to receive the response signal RS at the end office and, in the worst case, it becomes impossible to monitor the optical amplifying repeater, and impossible to perform troubleshooting of the fault point.

SUMMARY OF THE INVENTION

In view of the above problems, an object of the present invention is to enable the reception of the response signal at an end office, even after loss of the optical carrier signal due to a cable failure.

To achieve the above-noted object, the present invention is configured so as to comprise an optical amplifier, an automatic level control loop which includes a drive control unit, a supervisory unit which returns a response signal RS responding to a command signal CM from an end office, and a detection/control unit which controls the drive control unit so that the amplitude of the response signal RS is increased when the loss of the optical carrier signal S received from the optical transmission line is detected. In this manner, it is possible to continue returning a response signal in response to a command signal from an end station, even after the main input optical signal is disconnected.

BRIEF DESCRIPTION OF THE DRAWINGS

The above object and features of the present invention will be more apparent from the following description of the preferred embodiments with reference being made to the accompanying drawings, wherein.

DESCRIPTION OF THE PREFERRED EMBODIMENT

Before describing the embodiments of the present invention, the related art and the disadvantages therein will be described, with reference being made to the related drawings.

Figure 13:
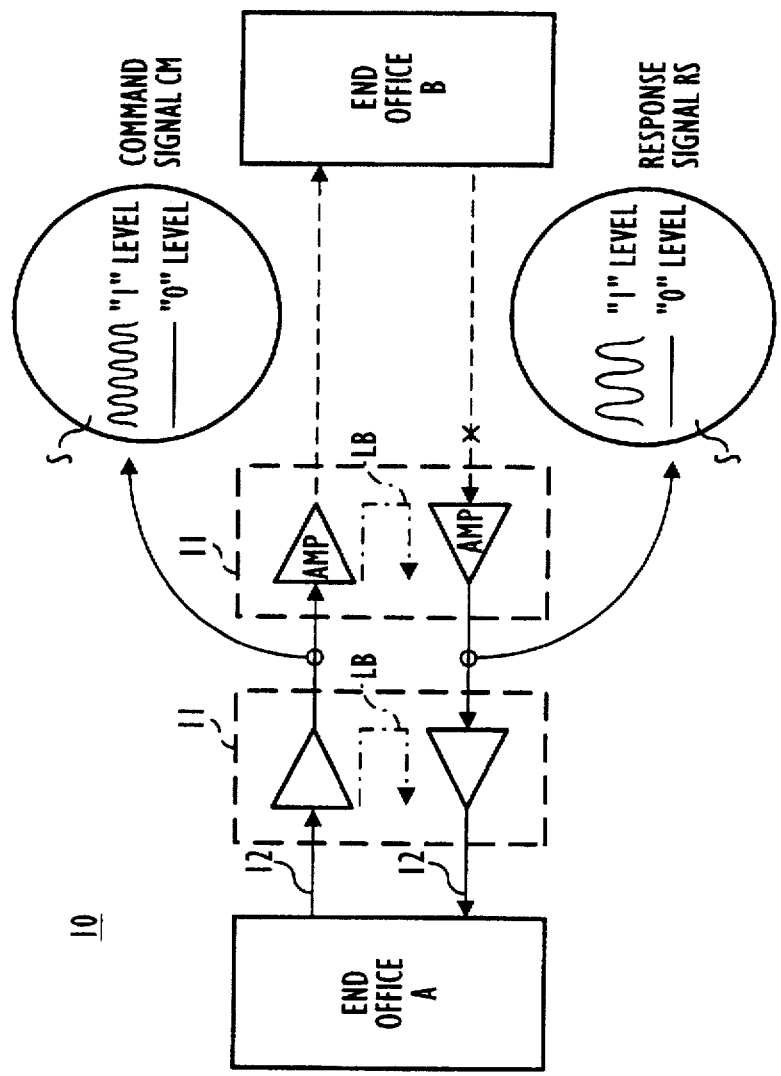
FIG. 13 is a drawing which shows the general configuration of a usual multi-stage optical amplifying and repeating transmission system.

FIG. 13 is a drawing which shows the general configuration of a general multi-stage optical amplifying and repeating transmission system. In this drawing, the reference numeral 10 denotes a multi-stage optical amplifying and repeating transmission system, in which a long-distance optical transmission line 12 is laid between two end offices (A and B), a plurality of optical amplifying repeaters 11 being connected in cascade along this optical transmission line 12.

The optical transmission line 12 normally comprises a pair of lines, an optical amplifier (AMP) connected to one, which is for one direction, and to the other, which is for the other direction. Thus, transfer of various data is performed via optical signals between the two end offices.

If the above-noted multi-stage optical amplifying and repeating transmission system 10 is a submarine optical communications system, the optical transmission line 12 would be of an extremely long length of, for example, several thousands of km. For this reason, if a failure occurs along the optical transmission line 12, the failure is located by remote control from an end station. In addition to when failures occur, remote control is also performed from an end office when maintenance is done. For this reason, monitoring or control using optical modulation is performed from an end office via the optical transmission line 12 with respect to each optical amplifying repeater 11 individually.

For example, assume that a failure occurs at the point marked "X" in the drawing when the end office B is performing data transmission to end office A. If this occurs, because the normal reception of data that had been performed at end office A is interrupted, the end office A immediately starts to search the offending failure. In searching for this failure, a command signal CM which is modulated on the main optical signal (carrier) and a response signal RS which is output from each optical amplifying repeater 11 in response to the CM are used.

In the case of the above-noted example, the command signal CM is sent from the end office A. This CM command is normally is a signal of several megahertz to several tens of megahertz which is superimposed onto the optical carrier signal. As an example, if a 10-MHz signal is present, the data is "1", and if the signal is not present, the data is "0". The above-noted response signal RS is usually a signal of several kilohertz which is modulated onto the optical carrier signal, where various information of the signal RS being represented by the particular frequency thereof.

The optical amplifying repeater 11 which sequentially receives the command signal CM from the end office A generates a response signal RS in response to the instructions which are included in the command signal CM, this being returned to the end office A via a loopback LB which is formed within the optical amplifying repeater 11. The end office A interprets the returned response signal RS to determine the state of each optical amplifying repeater 11. In the example shown in this drawing, since there is a discontinuity which occurs in the RS signals from the optical amplifying repeaters 11 which are immediately next to one another including the position "X", therebetween the end office A judges the failure to be located in the region of the point "X".

In the above description, while the example used is that in which a failure has occurred in the lower, left-directed, optical transmission line 12 in the drawing, if a failure occurs in the upper, right-directed optical transmission line 12, end office B would perform the same exact operations as described above for the end office A. In doing this, the direction of loopback LB would be the opposite of the arrow shown by the arrows.

Figure 14:
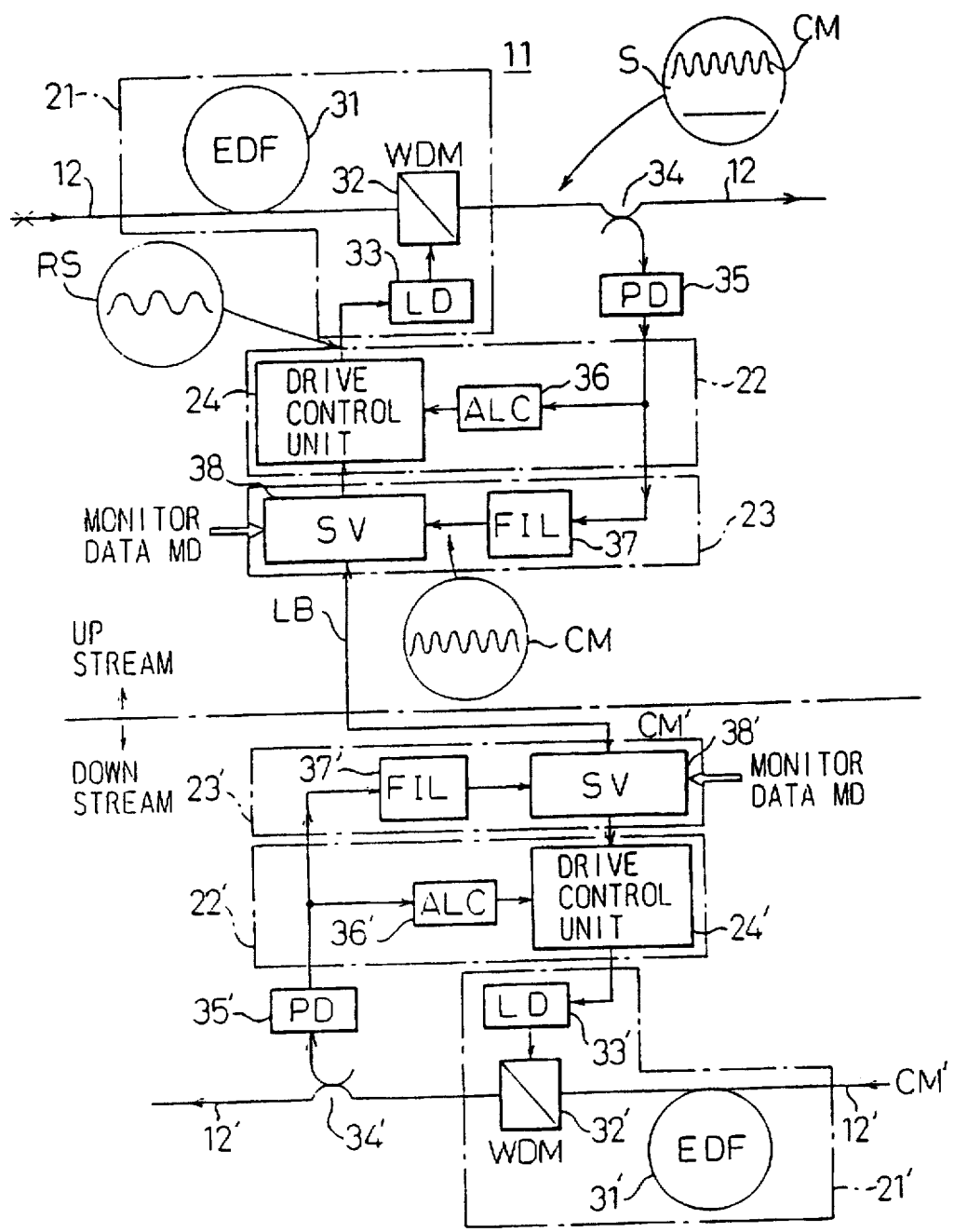
FIG. 14 is a drawing which shows the configuration of a usual optical amplifying repeater.

FIG. 14 is a drawing which shows the configuration of a usual optical amplifying repeater, which optical amplifying repeater 11, as illustrated, broadly speaking, comprises an optical amplifier 21, an ALC (automatic level control) loop 22 and a supervisory unit 23.

The optical amplifier 21 is inserted into the optical transmission line 12, and amplifies the light which it receives.

The automatic level control (ALC) loop 22 includes therein a drive control unit 24 for controllably driving the optical amplifier 21 and maintains as constant the output light level from the optical amplifier 21.

The supervisory unit 23 decodes instructions which are included in the command signal CM from an end office located at one end of the optical transmission line 12, and applies a response signal RS to the drive control unit 24 in response to these decoded instructions.

The optical amplifier 21 comprises for example an EDF (erbium-doped fiber) 31, a WDM (wavelength-division multiplexer) 32, and a laser diode LD 33. While this drawing shows what is known as a backward-pumping type of optical amplifier, it is also possible to make use of a forward-pumping type of optical amplifier.

Part of the light from the optical amplifier 21 is split off by means of the optical coupler 34. The thus split-off light output is first converted to an electrical signal by means of a photodetector (PD) 35, this being then applied to the automatic level control loop 22 and the supervisory unit 23.

The automatic level control loop 22, in addition to a drive control unit 24, has an automatic level control (ALC) circuit 36. This circuit 36 detects the difference between a reference level which is set beforehand and the output light level from the photodetector 35, and performs control of the drive control unit 24 so that the light output level is held constant. The drive control unit 24 controls the drive current of the laser diode 33.

The optical output signal from the photodetector 35, which contains the command signal CM, reaches the filter 37, at which only the command signal CM is extracted. The command contents of this command signal CM is decoded at the supervisory unit (SV) 38. The command contents indicate which one of the temperature of the optical amplifier 11, the input level, and the output level or other monitor data is to be output. The specified one monitor data MD is converted to a frequency signal output from a voltage-controlled oscillator (not shown in the drawing) in the supervisory unit 38 and applied to the drive control unit 24, thereafter reaching the wavelength-division multiplexer 32 as the response signal RS and modulating the optical carrier signal S.

In FIG. 14, the pair of optical amplifiers (AMP) for the upstream and the downstream, which are in each of the optical amplifying repeaters 11 shown in FIG. 13, are divided into the constitutional elements indicated with primes ('), to distinguish them from constitutional elements not so marked. Therefore, if a failure occurs at the point "X" in FIG. 14, in response to the command signal CM' transmitted from the lower right part of that drawing, the above-noted response signal RS is output (in the mode which is the opposite of that in the example of FIG. 13).

There is additionally a monitor control mode, in which the command signal CM is sent from the end office A, the response signal RS being sent as is from each of the optical amplifying repeaters 11, via the optical transmission line 12 to the end office B, in which mode the already presented explanation with regard to FIG. 14 can be applied as is.

Referring to FIG. 14, consider the case in which a cable failure occurs at the point "X" in this drawing, causing the main optical signal S input to the optical amplifier 21 to be lost, representing a loss of optical input.

When such a loss of optical input occurs, because there is no longer any input of the main optical signal (carrier) to the optical amplifier 21, this optical amplifier 21 is no longer able to apply a modulation by the above-noted response signal RS to this optical carrier signal. When this occurs, the optical amplifier 21 applies modulation by the RS signal to the ASE (amplified spontaneous emission) instead of the main optical signal S. This ASE is a noise component of a relatively wide bandwidth which is inevitably generated from each optical amplifying repeater.

Although it is theoretically possible to apply a modulation in accordance with the response signal RS to this ASE, in actuality the modulation of the amplified spontaneous emission by the response signal RS is insufficient. This can be explained in more detail as follows.

Figure 15:
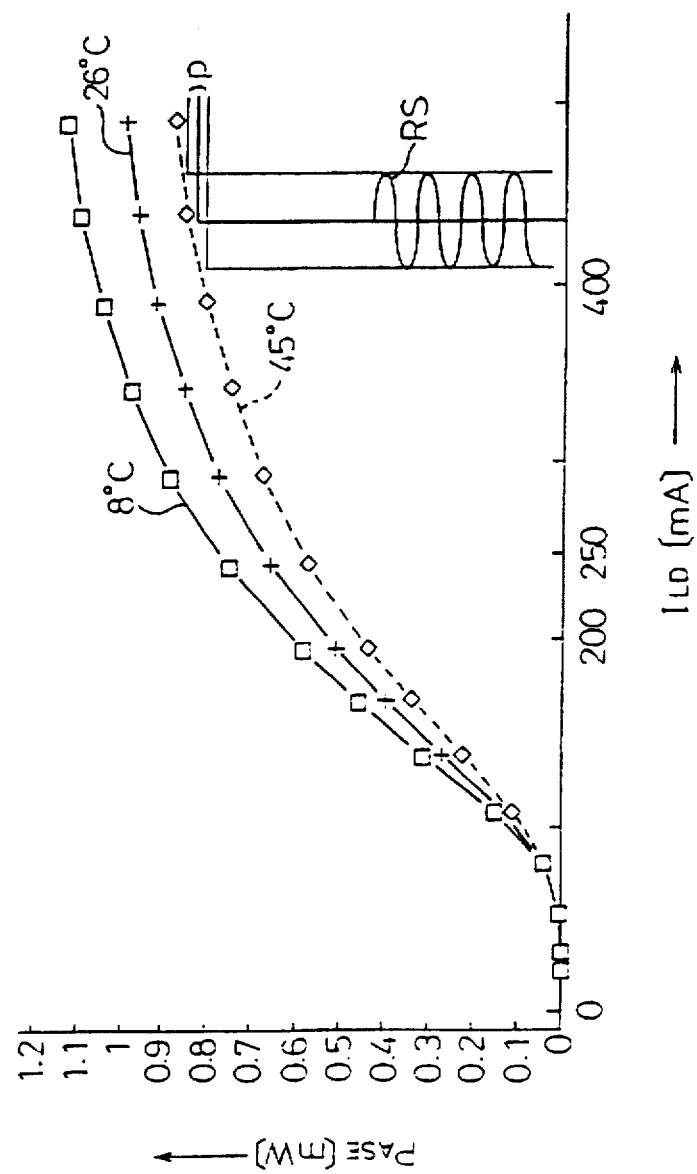
FIG. 15 is a graph which shows the relationship between the drive current and the amplified spontaneous emission (ASE) of an optical amplifier.

FIG. 15 is a graph which shows the relationship between the optical amplifier 21 drive current and the ASE (amplified spontaneous emission) output. As shown in this drawing, in the range in which the drive current $I_{LD}$ of the optical amplifying repeater is small (smaller than approximately 250 mA), the variation of the amplified spontaneous emission with respect to the deviation in $I_{LD}$ is relatively large.

In response to the loss of optical input, when the ALC (automatic level control) loop 22 operates sufficiently, so that drive current $I_{LD}$ of the optical amplifier 21 becomes large, in this range in which $I_{LD}$ is large (larger than approximately 250 mA), the variation in the output of the amplified spontaneous emission with respect to the variation of $I_{LD}$ is relatively small. For this reason, when applying modulation to the ASE by the amplitude of the normal response signal RS, the resulting modulation output is extremely small, as indicated by p [mW] in the drawing. Ultimately, after the optical carrier signal S is lost, even if modulation is applied to the ASE by the response signal RS, it becomes difficult to perform such modulation. As a result, it becomes difficult to receive the response signal RS at the end office and, in the worst case, it becomes impossible to monitor the optical amplifying repeater, and impossible to perform troubleshooting of the fault point, these being the problems cited previously.

In consideration of the above-noted problems, the present invention enables the reception of the response signal at an end office, even after loss of the optical carrier signal due to a cable failure.

Figure 1:
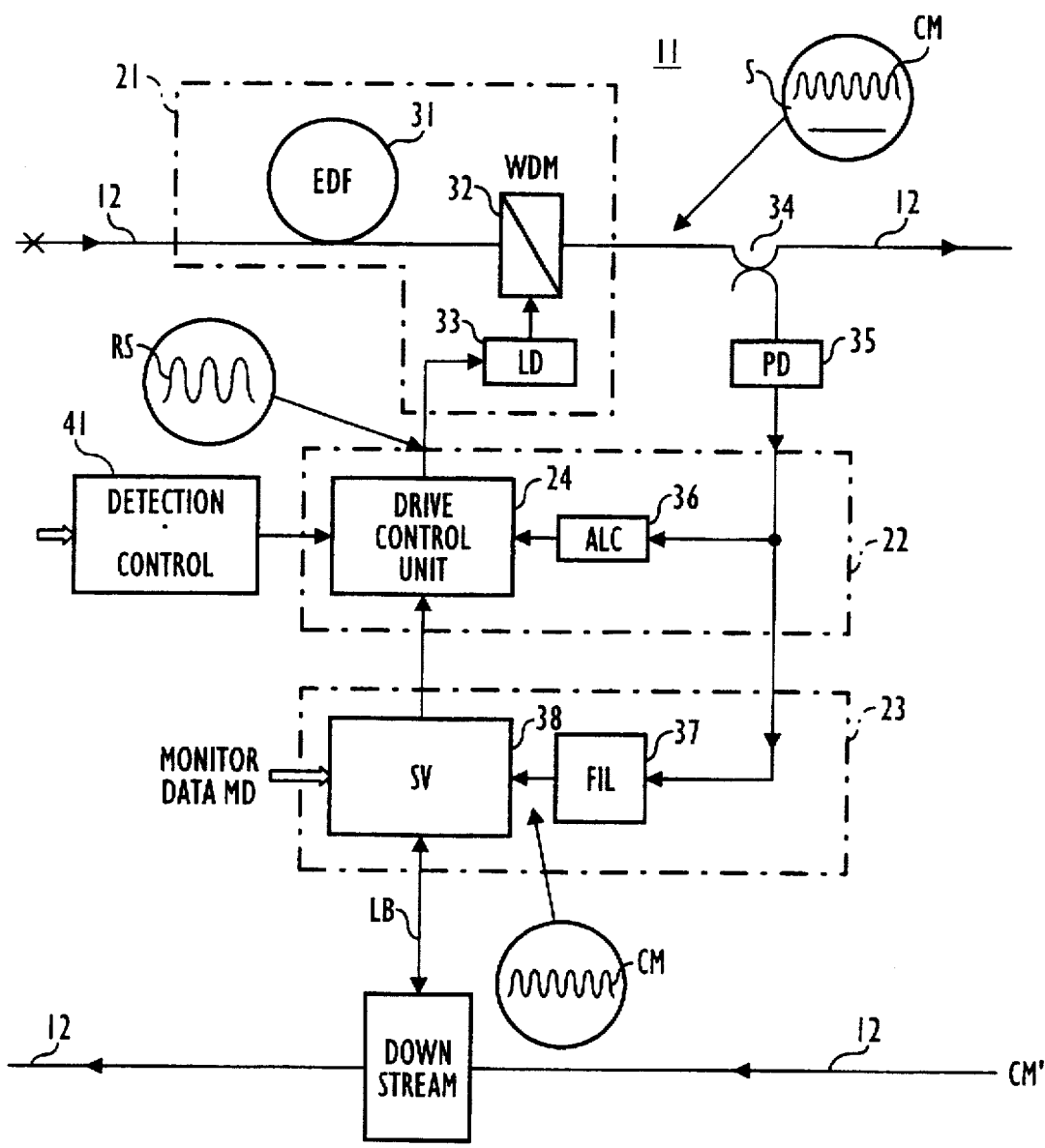
FIG. 1 is a drawing which shows the first basic configuration of an optical amplifying repeater according to the present invention.

FIG. 1 is a drawing which shows the first basic configuration of an optical amplifying repeater according to the present invention. In all of the drawings, similar constitutional elements are assigned the same references numerals or symbols.

(1) In the first aspect of the present invention, in an optical amplifying repeater 11 which has an optical amplifier 21, an ALC (automatic level control) loop 22, which includes therein a drive control unit 24 which drives and controls the optical amplifier 21 so that the optical output therefrom is of a constant level, and a supervisory unit 23 is provided which applies a response signal RS, in response to a command signal CM from an end office, to the drive control unit 24, a detection/control unit 41 is provided. When this detection/control unit 41 detects that the main optical signal S, i.e., the optical input received from the optical transmission line 12, is lost, it controls the drive control unit 24 so as to increase the amplitude of the response signal RS.

As will become clear from embodiments to be described later with reference made to various drawings, the present invention has the following aspects in its embodiments.

(2) In the second aspect of the present invention, the detection/control unit 41 comprises a filter and a comparator which detect, when the main optical signal S is lost, an increase of the output level of the ASE (amplified spontaneous emission) included in the optical output of the optical amplifier 21, at a particular wavelength in the spectrum of the ASE.

(3) In the third aspect of the present invention, the detection/control unit 41 comprises a decoder which detects that the main optical signals received from the optical transmission line 12 has been lost, the detection is made from information, when it is returned from the end office, indicative of a drop of the modulation degree of the response signal RS received at that end office.

(4) In the fourth aspect of the present invention, the detection/control unit 41 comprises a comparator which detects that the level of the main optical signal S has dropped.

(5) In the fifth aspect of the present invention, in an optical amplifying repeater 11 which has an optical amplifier 21, an ALC (automatic level control) loop 22 including therein a drive control unit 24 which drives and controls the optical amplifier 21 so that the optical output therefrom is of a constant level, and a supervisory unit 23 which applies a response signal RS, in response to a command signal CM from an end office, to the drive control unit 24, wherein an external modulator is provided at the output of the optical amplifier 21, which applies external modulation to the optical output from the optical amplifier 21, and a detection/ modulation unit is provided which makes when the loss of the main optical signal S is detected, the external modulator by modulation the response signal RS.

(6) In the sixth aspect of the present invention, the detection/modulation unit comprises of a filter and a comparator, which unit detects, when the main optical signal S is lost, an increase of the output level of the ASE (amplified spontaneous emission) included in the optical output of the optical amplifier 21 at a particular wavelength in the spectrum of the ASE.

(7) In the seventh aspect of the present invention, the detection/modulation unit comprises a decoder which detects that the main optical signals receieved from the optical transmission line 12 has been lost, the detection is made from information, when it is returned from the end office, indicative of drop of the modulation degree of the response signal RS received at that end office.

(8) In the eight aspect of the present invention, the detection/modulation unit comprises a comparator which detects that the level of the main optical signal S has dropped.

In the above-noted first aspect of the present invention, by means of the detection/control unit 41, when the loss of the main optical signal S is detected, the amplitude of the response signal RS is increased, so that the modulation degree of signal RS to the ASE (amplified spontaneous emission) is increased.

In the above-noted second aspect of the present invention, when the main optical signal S is lost, the loss of the S signal is detected by the increase in the ASE (amplified spontaneous emission) at a particular wavelength.

In the above-noted third aspect of the present invention, the loss of the main optical signal S is detected indirectly, by having the optical amplifying repeater 11 notified of a drop in the modulation degree of the RS signal from the end office.

In the above-noted fourth aspect of the present invention, the loss of the main optical signal S is detected by directly monitoring the input level of the main optical signal S.

In the above-noted fifth aspect of the present invention, an external modulator is employed to bring about the same effect as in the above-noted first aspect of the present invention, in which the modulation degree is increased by increasing the amplitude of the response signal RS.

In the above-noted sixth through eight aspects of the present invention, the same effects are obtained as in the above-noted second through fourth aspects of the present invention, respectively.

Figure 2:
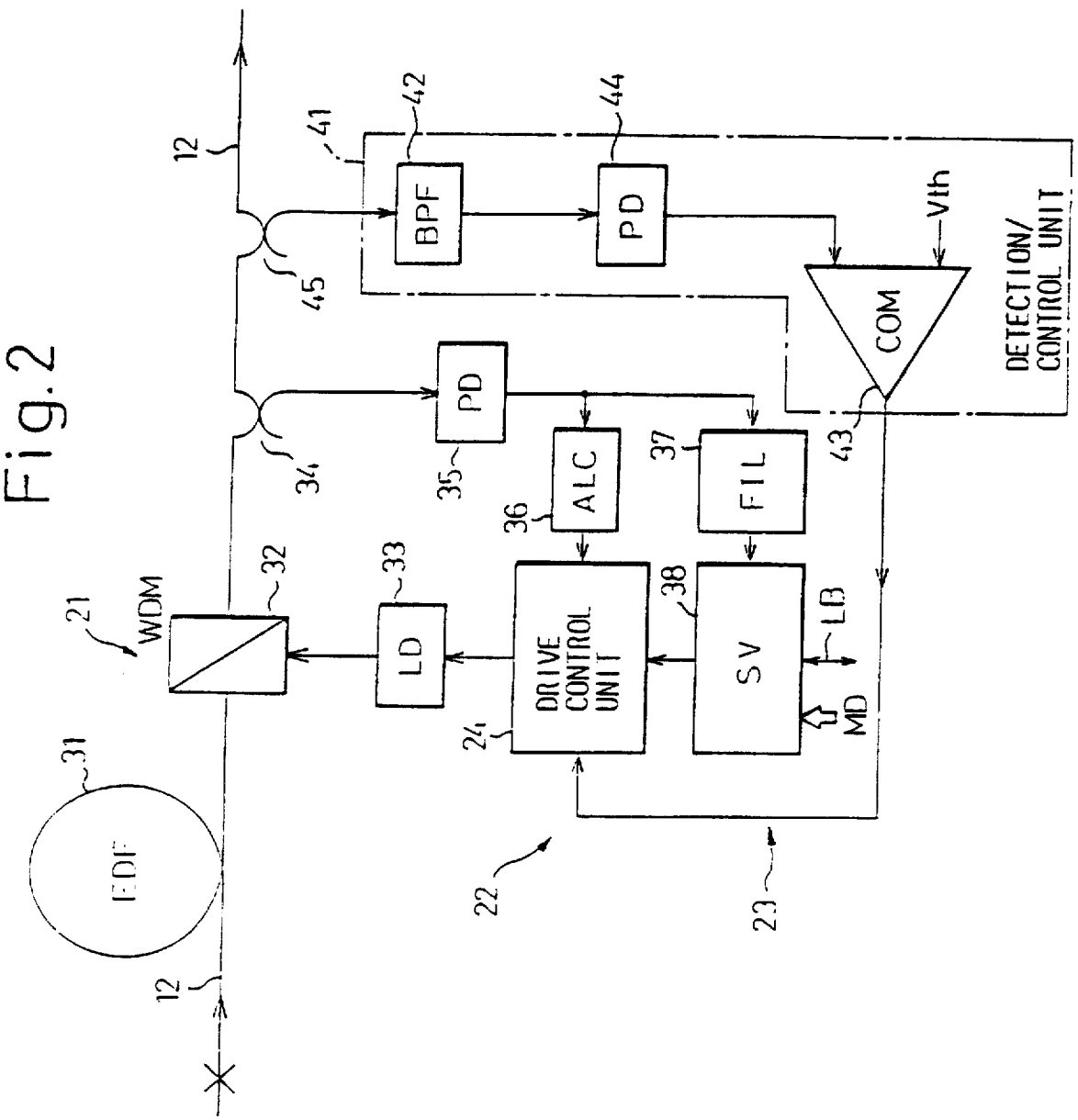
FIG. 2 is a drawing which shows an example of the first configuration of a detection/control unit 41 according to the present invention.

FIG. 2 is a drawing which shows an example of the first configuration of a detection/control unit 41 according to the present invention. A detection/control unit 41 according to this first configuration basically comprises a bandpass filter (BPF) 42 and a comparator (COM) 43. In addition, the reference numeral 44 denotes a photodetector (PD) which converts the optical signal from the filter 42 to an electrical signal, and 45 is an optical coupler which splits off part of the optical output from the optical amplifier 21. This first configuration will be described with reference to related drawings.

Figure 3:
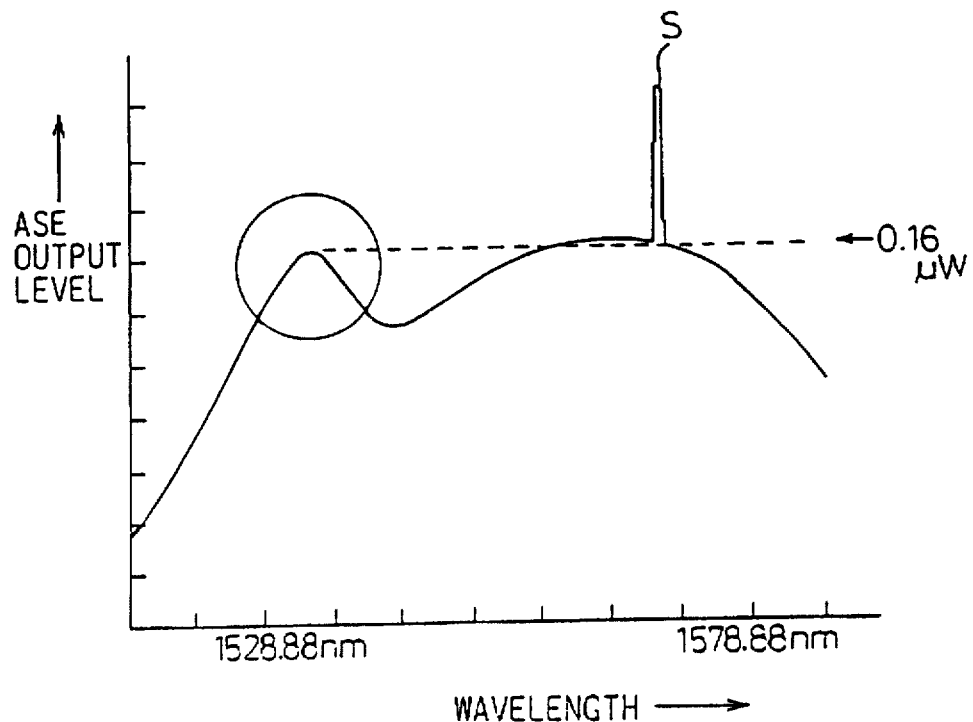
FIG. 3 is a spectrum plot of the amplified spontaneous emission (ASE) which exists along with the main optical signal (carrier)
Figure 4:
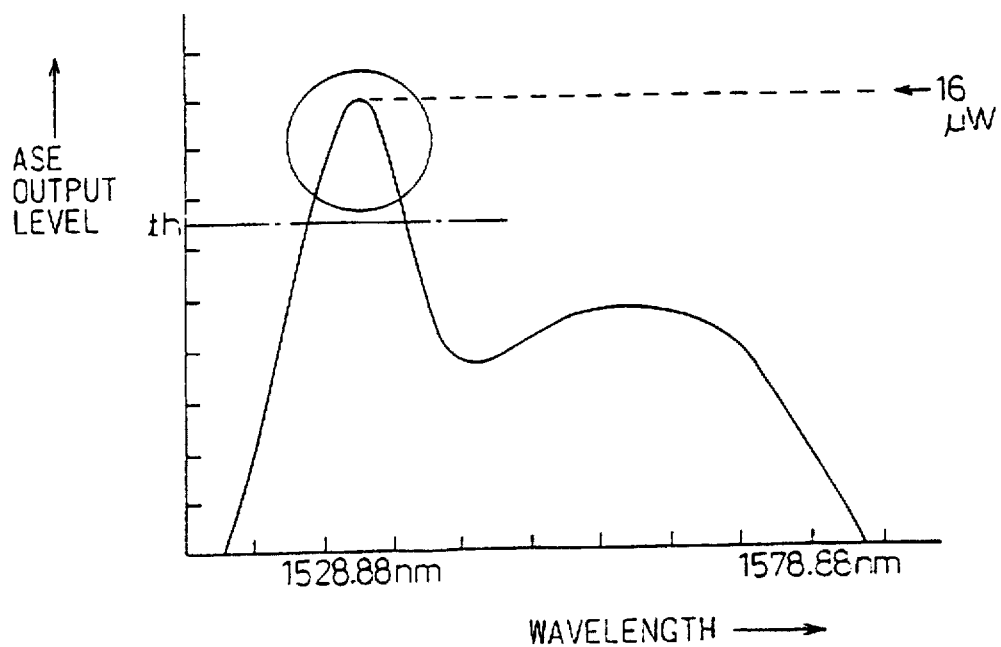
FIG. 4 is a spectrum plot of the amplified spontaneous emission (ASE) when the main optical signal (carrier) is lost.

FIG. 3 is a spectrum plot of the amplified spontaneous emission (ASE) which exists along with the main optical signal, and FIG. 4 is a spectrum plot of the amplified spontaneous emission (ASE) when the main optical signal is lost. The ASE output level when there is no cable failure and the main optical signal S is present is, as shown in FIG. 3, approximately 0.16 μW at a particular wavelength (for example, 1528.8 nm).

When a cable failure occurs, however, the ASE output level when there is no longer a main optical signal, as shown in FIG. 4, increases sharply to approximately 16 μW at the above-noted particular wavelength.

The first configuration example is devised with consideration to the above-noted fact, so that by setting the threshold level to the level th as shown in FIG. 4, when this threshold level th is exceeded, the loss of the main optical signal is detected, and control is performed so as to increase the response signal RS amplitude with respect to the drive control unit 24 even more.

That is, the filter 42 shown in FIG. 2 extracts the ASE at the above-noted particular wavelength (1528.88 nm). This extracted ASE signal is converted to an electrical signal by the photodetector 44, and is input to the comparator 43. The comparator 43 has a reference voltage of $V_{th}$, so that when this electrical signal has a level that exceeds $V_{th}$, it is judged that the main optical signal S has been lost. The above-noted reference voltage $V_{th}$ corresponds to the threshold level th which is shown in FIG. 4. The output of this comparator 43 controls the drive control unit 24 so that the amplitude of the response signal RS increases.

Figure 5:
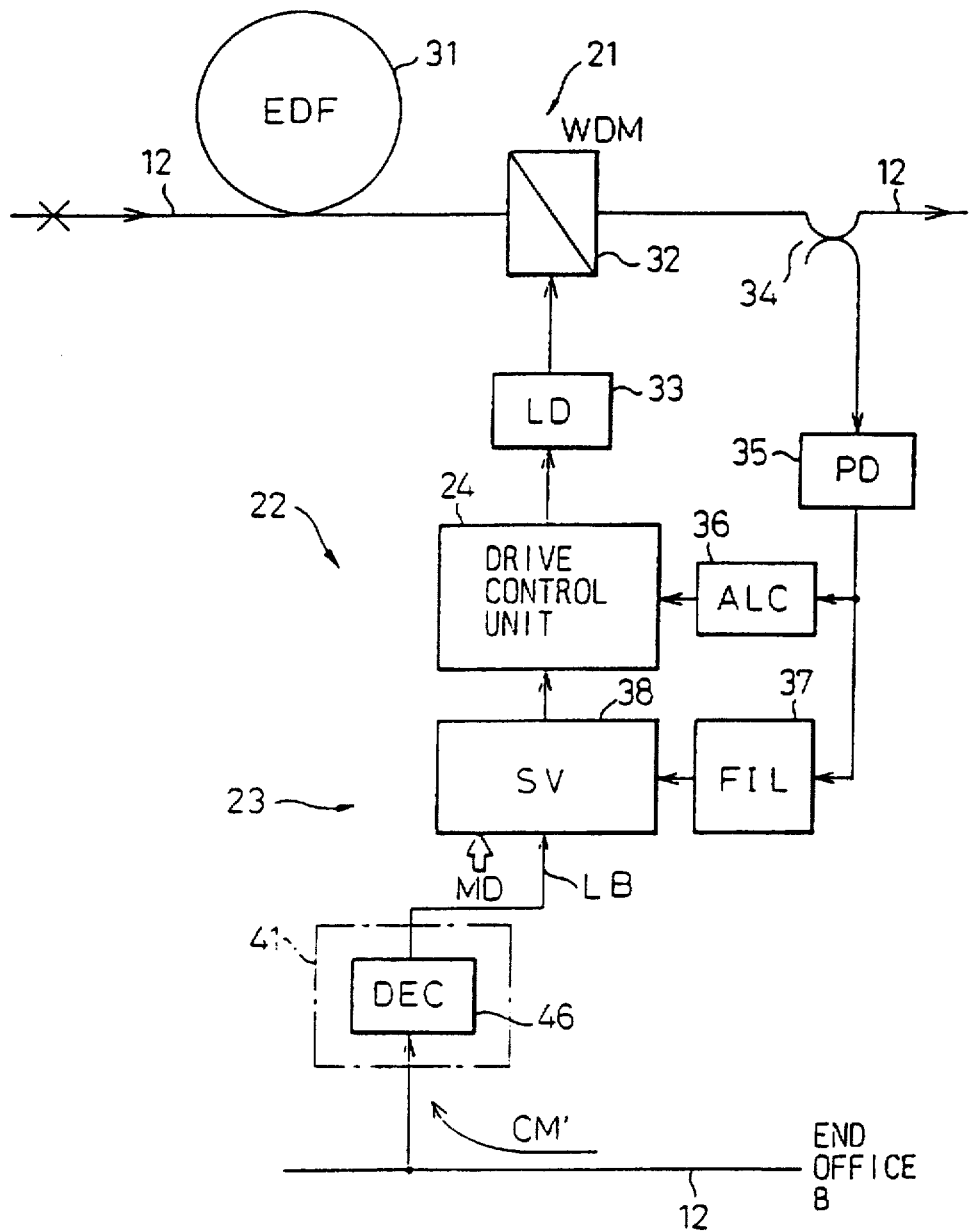
FIG. 5 is a drawing which shows an example of the second configuration of the detection/control unit 41 according to the present invention.

FIG. 5 is a drawing which shows an example of the second configuration of a detection/control unit 41 according to the present invention. In this second configuration example, when for example a cable failure occurs at the point "X" shown in this drawing, when information (indicated as CM' in the drawing) that indicates that the modulation degree of response signal RS received at the end office B has dropped is returned from that end office B, the detection/control unit 41 indirectly detects the loss of the main optical signal from this information CM'.

In addition, accompanying this detection, the drive control unit 24 is controlled so that amplitude of the response signal RS is further increased.

Because the above-noted information CM', in a similar manner as the command signal CM, is represented as a pattern of "1" and "0" data, by decoding this pattern of "1" and "0" data by means of the decoder (DEC) 46, CM' is detected. The detected CM' is applied to the supervisory unit 38.

Figure 6:
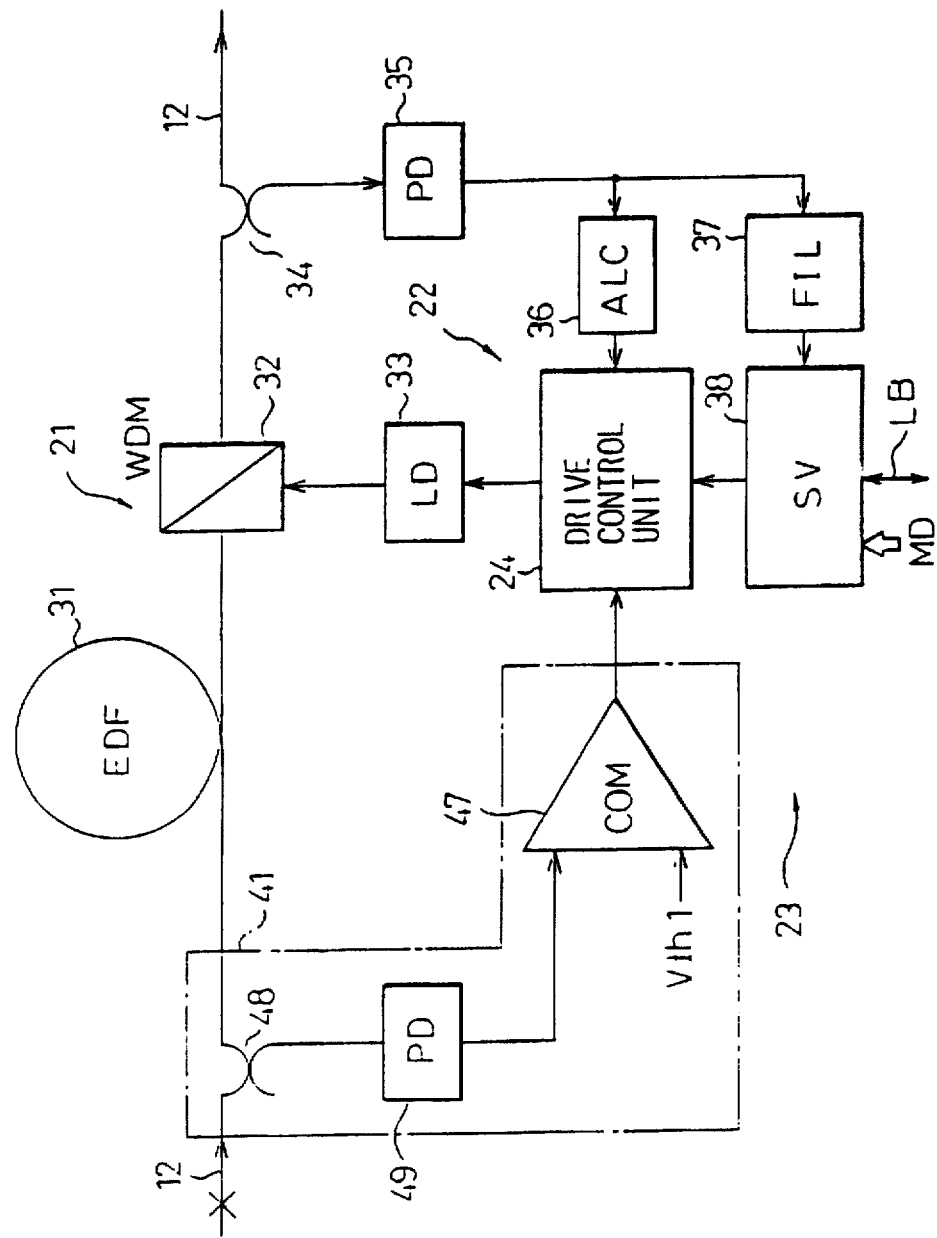
FIG. 6 is a drawing which shows an example of the third configuration of the detection/control unit 41 according to the present invention.

FIG. 6 is a drawing which shows an example of the third configuration of a detection/control unit 41 according to the present invention. In this third configuration example, the detection/control unit 41 monitors whether or not the main optical signal S level at the input of the optical amplifier 21 has dropped, and by means of this monitoring detects the loss of the main optical signal when this drop in level occurs. When detection of this loss of signal is made, the drive control unit 24 is controlled so that it increases the amplitude of the response signal RS.

Specifically, the detection/control unit 41 comprises a comparator (COM) 47. To this comparator 47 is input the electrical signal resulting from the conversion, by means of the photodetector (PD) 49 of part of the optical input which is split off at the input by the optical coupler 48. This input is the total optical power, which includes not only the main optical signal, but also the ASE. When the total optical power falls below a reference level (reference voltage $V_{th1}$) which is established beforehand, it is judged the main optical signal has been lost, and the comparator 47 outputs a detection signal. This detection signal is applied to the drive control unit 24.

Figure 7:
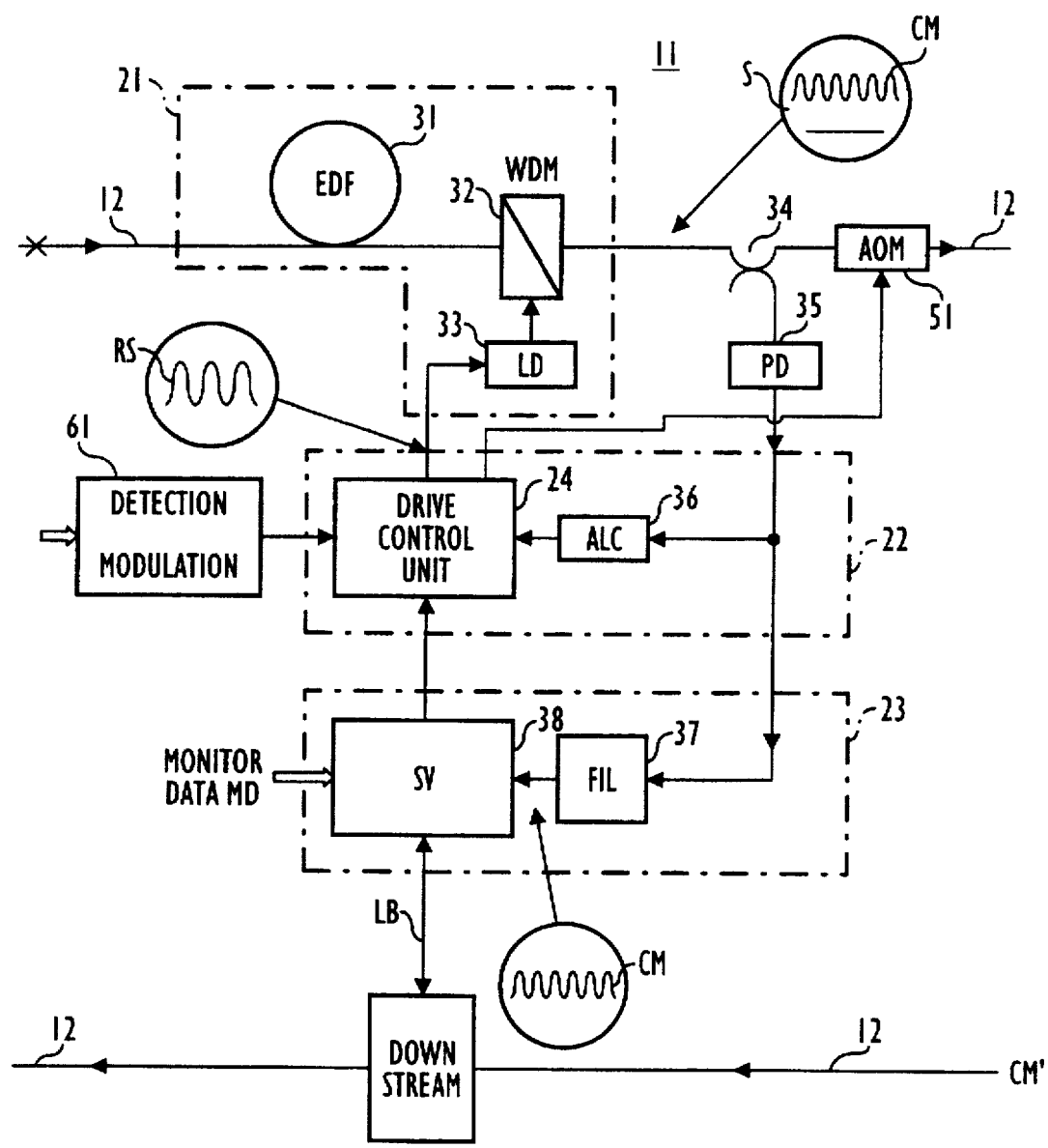
FIG. 7 is a drawing which shows the second basic configuration of an optical amplifying repeater according to the present invention.

FIG. 7 is a drawing which shows the second basic configuration of an optical amplifying repeater according to the present invention. According to this second basic configuration, an external modulator 51 and a detection/ modulation unit 61 are provided. While the detection/ modulation unit 61 is similar to the already-described detection/control unit 41, when the loss of the main optical signal S is detected, the detection/modulation unit 61, rather than applying the response signal RS at the drive control unit 24 to the optical amplifier 11, applies it to the external modulator 51. By doing this, the response signal RS modulation, which is difficult to apply to the ASE, is performed by an external modulator 11, thereby raising the modulation degree to a level which enables reception at the end office.

In this manner, the external modulator 51 is provided at the output end of the optical amplifier 21, external modulation according to the response signal RS being applied to the output of the amplifier 21. An example of this is the widely known AOM (acousto-optic modulator), a device which makes use of the acousto-optic effect.

The configuration of the detection/modulation unit 61 which performs modulation control to the external modulator 51 is approximately the same as already described with regard to the detection/control unit 41.

Figure 8:
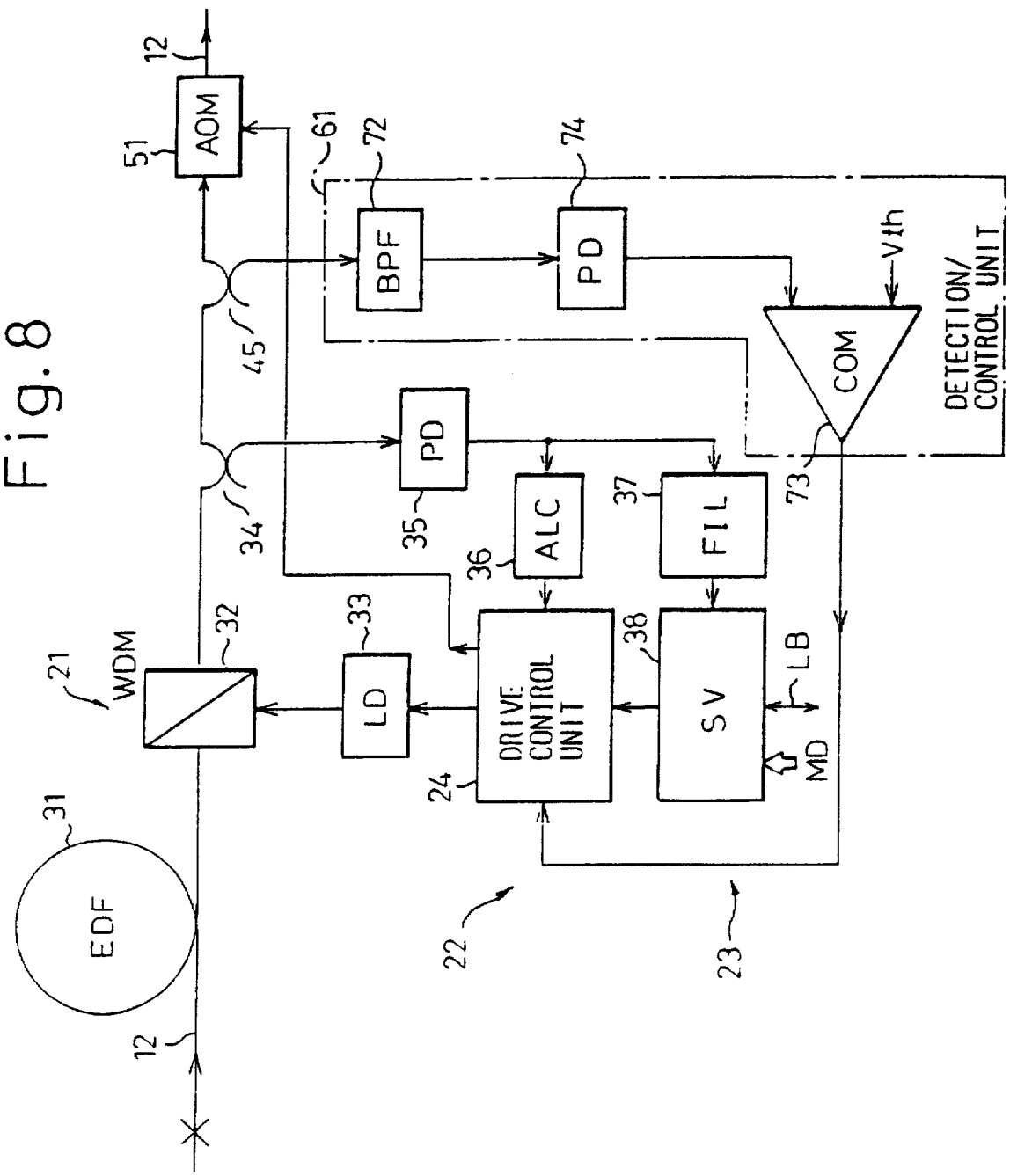
FIG. 8 is a drawing which shows an example of the first configuration of a detection/modulation unit 61 according to the present invention.

FIG. 8 is a drawing which shows an example of the first configuration of a detection/modulation unit 61 according to the present invention. In the first configuration of the detection/modulation unit 61, the configuration is approximately the same as and the action is the same as the first configuration example of the detection/control unit 41. Therefore, the reference numerals 72, 73, and 74 in this drawing correspond to the bandpass filter (BPF) 42, the comparator 43, and the photodetector (PD) 44, respectively, which are shown in FIG. 2.

Figure 9:
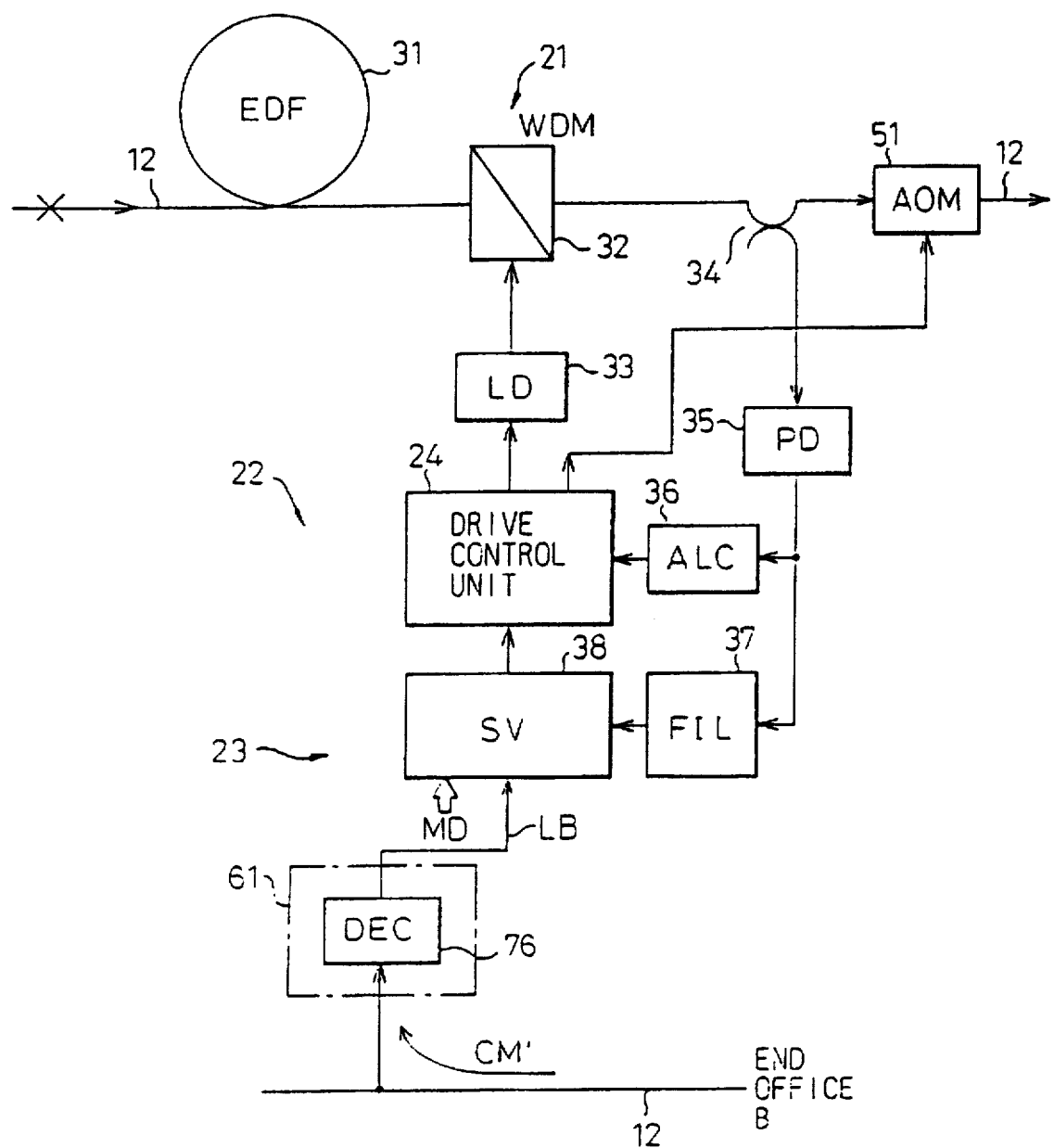
FIG. 9 is a drawing which shows an example of the second configuration of a detection/modulation unit 61 according to the present invention.

FIG. 9 is a drawing which shows an example of the second configuration of a detection/modulation unit 61 according to the present invention. In the second configuration of the detection/modulation unit 61, the configuration is approximately the same as and the action is the same as the second configuration example of the detection/control unit 41. Therefore, the reference numeral 76 in this drawing corresponds to the decoder 46 which is shown in FIG. 5.

Figure 10:
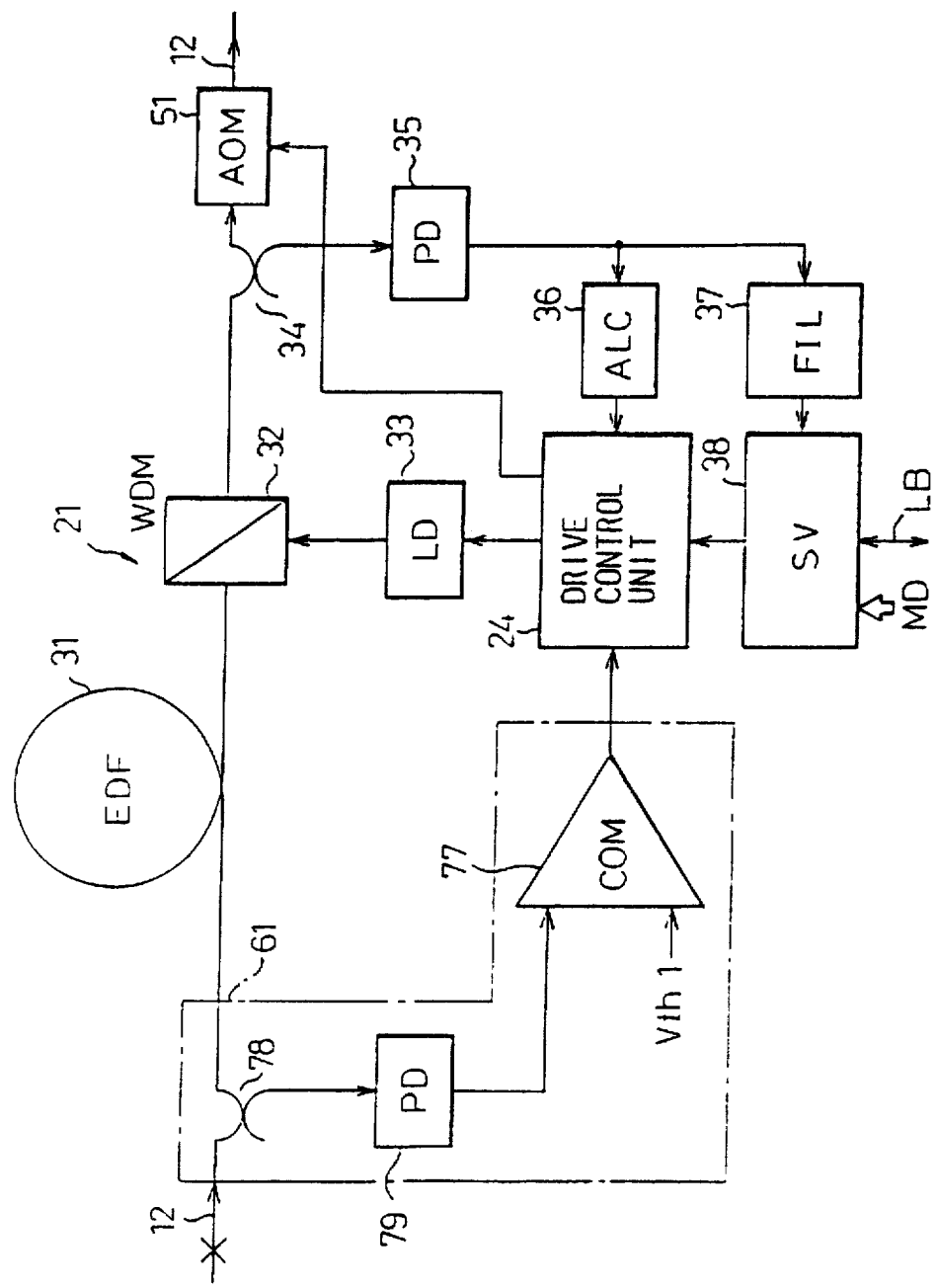
FIG. 10 is a drawing which shows an example of the third configuration of a detection/modulation unit 61 according to the present invention.

FIG. 10 is a drawing which shows an example of the third configuration of a detection/modulation unit 61 according to the present invention. In the third configuration of the detection/modulation unit 61, the configuration is approximately the same as and the action is the same as the third configuration example of the detection/control unit 41. Therefore, the reference numerals 77, 78, and 79 in this drawing correspond to the comparator (COM) 47, the optical coupler 48, and the photodetector (PD) 49, respectively, which are shown in FIG. 6.

Figure 11:
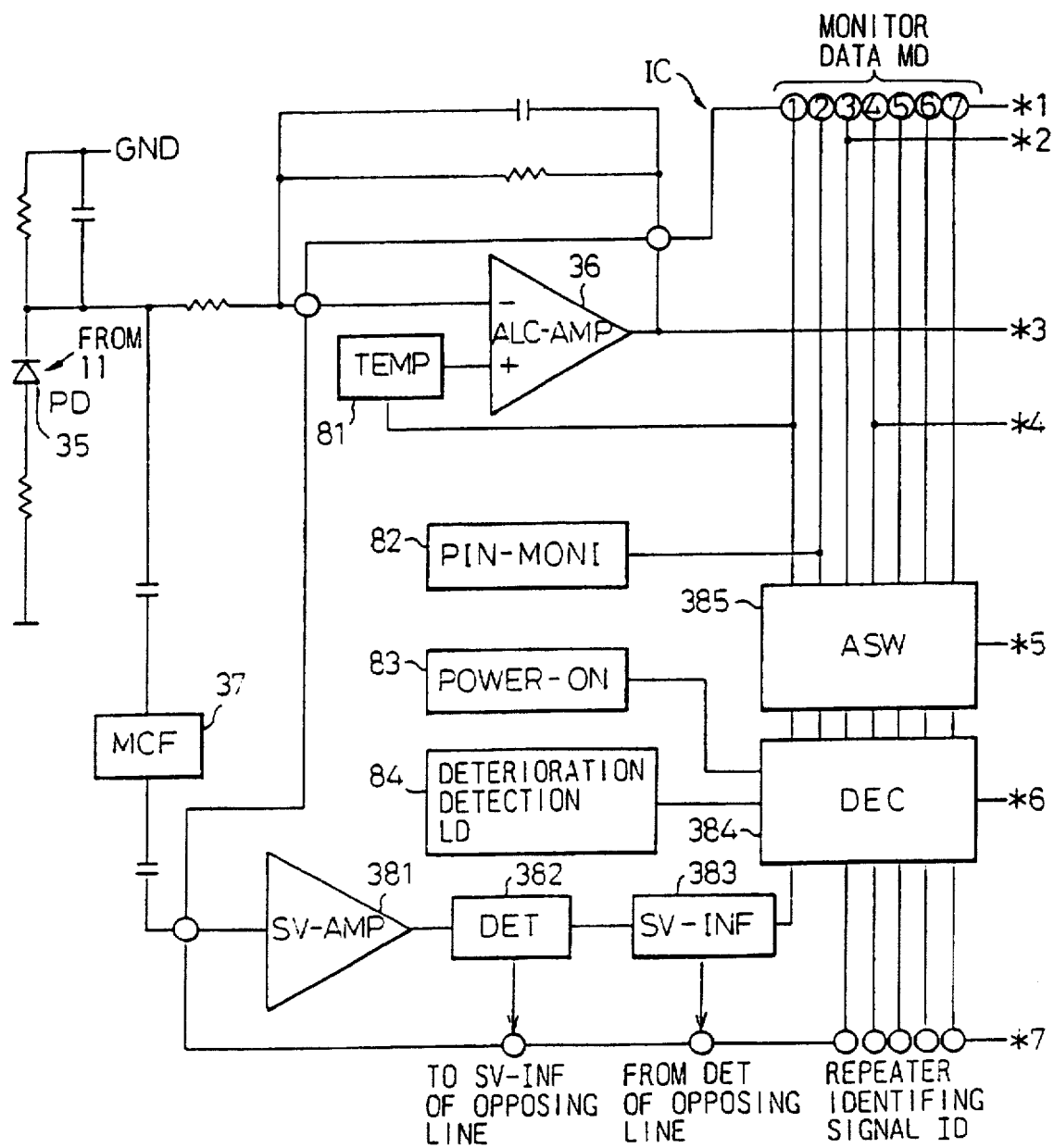
FIG. 11 is a drawing (1) which shows the details of block 22 and block 23 which are shown in FIGS. 1 and 7.
Figure 12:
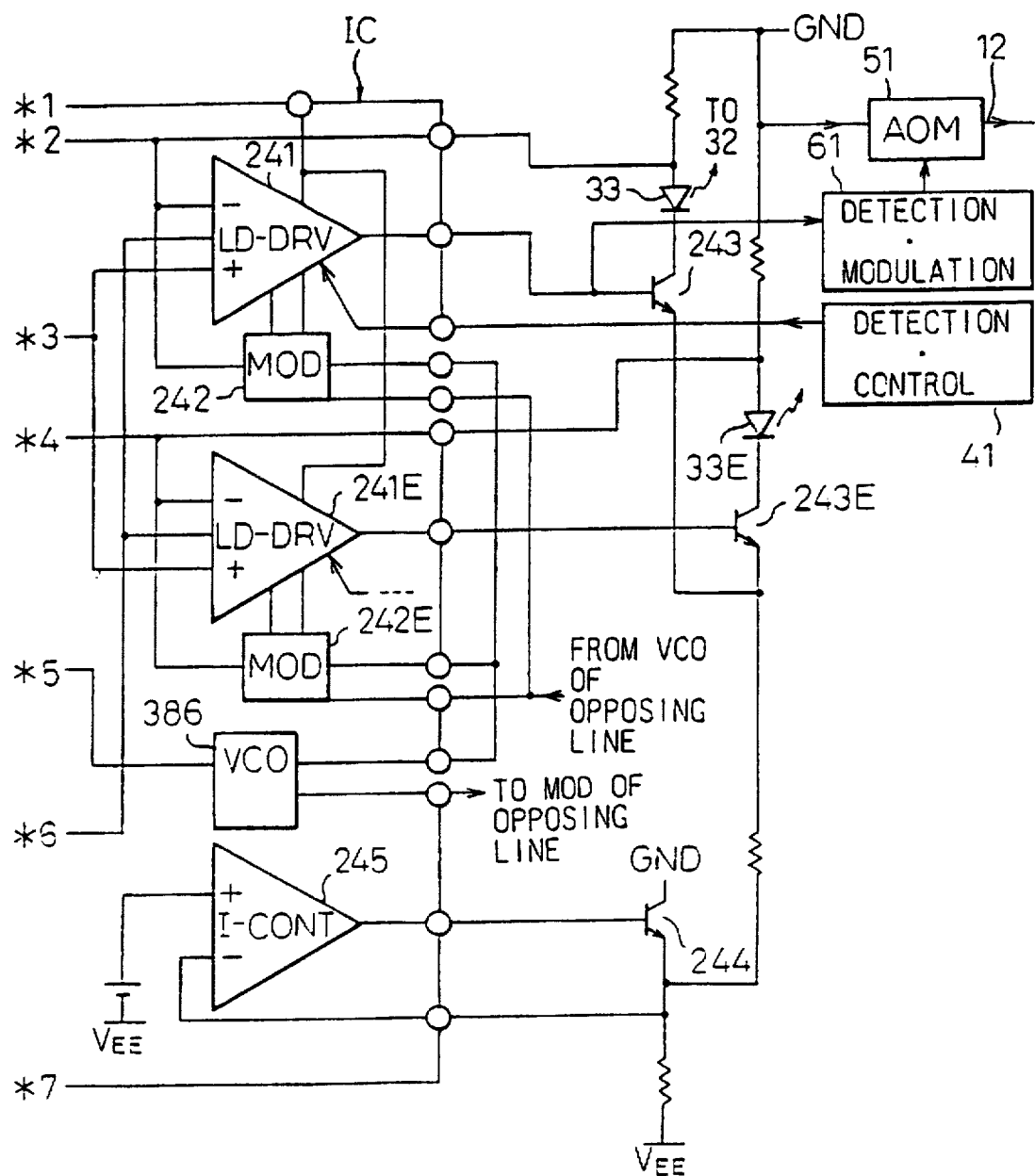
FIG. 12 is a drawing (2) which shows the details of block 22 and block 23 which are shown in FIGS. 1 and 7.

FIG. 11 is a drawing (1) which shows a detailed example of blocks 22 and 23 in FIG. 1 and FIG. 7. FIG. 12 is a drawing (2), which is a continuation of FIG. 11. In FIG. 11 and FIG. 12, the common parts of FIG. 1 and FIG. 7 are grouped as one part, while the detection/control unit 41 of FIG. 1 and both the external modulator 51 and detection/modulation unit 61 of FIG. 7 are drawn separately on the same drawing. Therefore, when making use of the detection/control unit 41, both the detection/modulation unit 61 and external modulator 51 are ignored. In the same manner, when making use of both the external modulator 51 and the detection/modulation unit 61, the detection/control unit 41 is ignored.

In FIG. 11 and FIG. 12, constitutional elements which are the same as in FIG. 1 and FIG. 7 are assigned the same reference numerals. However, with regard to the drive control unit 24, constituent elements thereof have been assigned reference numerals such as 241, 242, and so on. In the same manner, with regard to the supervisory unit (SV) 38, constituent elements thereof have been assigned reference numerals such as 381, 382, 383, and so on. Constituent elements which have a suffixed E (Emergency), such as 241E and 242E and so on, are redundant elements corresponding to elements 241, 242, and so on.

The detection/control unit 41, which is an essential point of the present invention, operates so as to increase the gain of the laser diode driver (LD-DRV) 241 when the main optical signal S is lost.

The detection/modulation unit 61, which is another essential point of the present invention, operates so as to apply the response signal RS from the laser diode driver 241 to the external modulator 51 when the main optical signal S is lost.

Each of the parts will be described below. The parts of FIG. 11 and FIG. 12 marked IC are fabricated as an integrated circuit. This IC forms the central part of the optical amplifying repeater circuitry, which performs the ALC (automatic level control) and SV (supervisory control) functions.

In performing the ALC operation, first the laser diode drive current level is established by the ALC amplifier (ALC-AMP) 36, which establishes the ALC level and frequency band, according to the voltage monitored from the optical output of the optical amplifier 11, by means of the photodetector (PD) 35. The laser diode driver (LD-DRV) 241 causes a power transistor 243 to operate and controls the laser diode pumping drive current so that the laser diode drive current is proportional to that laser diode drive current level. Switching between the LD-DRV 241 and 241E to perform switching between normal and standby, or between the working and protection element is performed by a signal from the decoder (DEC) 384. The current control amplifier 245 controls a dummy current which is the pumping laser diode drive current subtracted from a prescribed pumping laser diode drive current (maximum of 700 mA), by means of a power transistor 244. To achieve cancellation of temperature-caused variations in the optical system, the reference voltage of the ALC amplifier 36 (non-inverting input terminal) is varied in accordance with the temperature sensor (TEMP) 81, thereby providing temperature compensation.

In performing the above-noted supervisory (SV) operation, a command signal CM (10-MHz sub-carrier) which has passed through a filter MCF (monolithic crystal filter) 37 is held constant, regardless of the optical output, by having the supervisory amplifier (SV-AMP) 381 perform gain control, and then demodulated to a baseband signal (a data pattern of "1" and "0") by the detector (DET) 382, after which it is sent via an interface (SV-INF) 383 to a decoder (DEC) 384. The detector (DET) 382 outputs a command signal to the opposing line, and the supervisory interface (SV-INF) 383 receives a command signal from the opposing line and sends it to the decoder (DEC) 384. At the decoder (DEC) 384, detection is performed for an address coincidence between the demodulated command signal and the repeater identification signal ID, and if the address coincides, this is recognized as an accessing of this repeater 11, after which one of the monitor data MD is selected and output from an analog switch (ASW) 385. The monitor voltage (monitor data) is sent, via the ASW 385 to a voltage controlled oscillator (VCO) 386 and then converted to a frequency and serves as the monitor signal. This monitor signal is controlled to an amplitude which is proportional to the pumping laser diode drive current, by means of the modulators (MOD) 242 of both the home line and the opposing line, passes though the laser driver (LD-DRV) 241, and is modulated onto the pumping laser diode drive current.

A POWER-ON 83 resets, when the power is applied, the decoder (DEC) 384, places the repeater 11 into the normal state, selects the working pumping laser diode, and shuts off the monitor output. The laser diode deterioration detection unit 84 judges that the laser diode has deteriorated and switches to the spare laser diode 33E if the pumping laser diode drive current equals or exceeds a threshold value and also the backward light of the laser diode is equal to or lower than a threshold value. A PIN-MONI 82 monitors the normal state of the photodiode 35, and generates a response signal RS, which indicates an abnormality thereof, if an abnormality occurs.

As described in detail above, the first through eighth aspects of the present invention have the following effects.

According to the first aspect of the present invention, it is possible to continue to send the response signal RS to an end office even after the main optical signal S is lost.

According to the second aspect of the present invention, it is possible to detect the loss of the main optical signal with high accuracy by monitoring a signal at a particular wavelength of the ASE (amplified spontaneous emission).

According to the third aspect of the present invention, it is not necessary to provide a mechanism in each optical amplifying repeater for detecting a loss of the input signal.

According to the fourth aspect of the present invention, it is possible for each optical amplifying repeater to directly and reliably detect the loss of input.

According to the fifth aspect of the present invention, because an external modulator is used, there is a reliable improvement in the modulation degree of the response signal.

According to the sixth, seventh, and eight aspects of the present invention, the effects of the second, third, and fourth aspects, respectively, of the present invention are achieved.

We claim:

1. An optical amplifying repeater comprising an optical amplifier which is inserted into an optical transmission line and amplifies a received optical input, an ALC (automatic level control) loop including a drive control unit which produces an ALC signal to control said optical amplifier, an optical output from said optical amplifier being maintained at a constant level, and a supervising unit which produces a response signal RS, in response to a command signal CM from an end office disposed at one end of said optical transmission line, and applies said response signal to said drive control unit, said optical amplifier being controlled, via said drive control unit, by both said ALC signal and said response signal RS, further comprising a detection/control unit, loss of said received optical input from said optical transmission line is detected by said detection/control unit, said detection/control unit controls said drive control unit to increase the amplitude of said response signal RS.

2. An optical amplifying repeater according to claim 1, wherein said detection/control unit includes a filter and a comparator, when said received optical input is lost, an increase in output level at a particular wavelength in a spectrum of an amplified spontaneous emission (ASE) is detected by said filter and the detected increase is applied, via said comparator, to said drive control unit to increase the amplitude of said response signal R.S.

3. An optical amplifying repeater according to claim 1, wherein said detection/control unit comprises a decoder (46) which detects that the main optical signals received from the optical transmission line 12 has been lost, the detection is made from information, when it is returned from the end office, indicative of a drop of the modulation degree of the response signal RS received at that end office.

4. An optical amplifying repeater according to claim 1, wherein said detection/control unit comprises a comparator which detects a drop in the level of said main optical signal.

* * * * *